April 4, 1967

M. GARBUNY 3,312,895

TRANSMISSION LINE MONITOR APPARATUS UTILIZING ELECTROMAGNETIC
RADIATION BETWEEN THE LINE AND A REMOTE POINT
Filed Oct. 23, 1962

INVENTOR
Max Garbuny
BY Maury I. Hull
ATTORNEY

United States Patent Office 3,312,895
Patented Apr. 4, 1967

3,312,895
TRANSMISSION LINE MONITOR APPARATUS UTILIZING ELECTROMAGNETIC RADIATION BETWEEN THE LINE AND A REMOTE POINT
Max Garbuny, Pittsburgh, Pa., assignor to Westinghouse Electric Corporation, East Pittsburgh, Pa., a corporation of Pennsylvania
Filed Oct. 23, 1962, Ser. No. 232,501
8 Claims. (Cl. 324—96)

This invention relates to improvements in apparatus for monitoring a high voltage transmission line, and more particularly to monitor apparatus employing telemetering techniques for providing an indication at a point remote from the line of changes in the current in the line, and having no direct electrical connection between the monitor and the line.

Prior art apparatus for measuring the instantaneous current flowing in a high voltage transmission line usually employs a current transformer, and as will be readily understood by those skilled in the art, since the safety of the user requires that the indicating apparatus be at ground potential, high voltage insulation is required in the current transformer, making the current transformer bulky and expensive.

In summary, the monitor apparatus of the instant invention provides means for obtaining a small current, or a small voltage and current proportional to the instantaneous current in the line, either by employing a pickup coil inductively coupled to the transmission line, or by an I-R drop between two points on the line. This voltage or current is fed to a small infrared energy radiating element whose thermal time constant is in the order of, or smaller than, the period of one alternation. The radiating element is located at the focal point of an ellipsoidal mirror which projects part of the infrared radiation over a suitable distance onto an infrared detector which is located at the focal point of a second ellipsoidal mirror. The output of the infrared detector is then fed through a 120 cycle amplifier of suitable bandwidth to a communication line and thence to a monitor which may include a suitable end device. This infrared receiving equipment is held near ground potential and is easily accessible. It is calibrated and measures accurately instantaneous current values during each alternation and detects transients within a fraction of a cycle.

Accordingly, a primary object of the invention is to provide new and improved monitor apparatus for a high voltage transmission line.

Another object is to provide new and improved monitor apparatus employing telemetering techniques.

A further object is to provide a source of infrared radiation at a transmission line, the intensity of which varies in accordance with variations in the current in the line, and to provide means for detecting the infrared radiation and obtaining a signal therefrom indicative of the instantaneous amount of current in the line.

Still a further object is to provide new and improved monitor apparatus which will give a measure of normal current variations in the line, and which will give an indication of sudden increases in the current in the line beyond the limits of normal variation.

These and other objects and advantages will become more clearly apparent after a study of the following specification, when read in connection with the accompanying drawings, in which.

Figure 1:
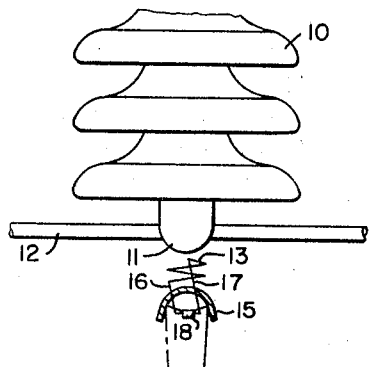
FIGURE 1 is a diagram of apparatus according to one embodiment of the invention.

Referring now to the drawings, in which like reference numerals are used throughout to designated like parts, for a fuller understanding of the invention, and in particular to FIG. 1 thereof, there is shown at 10 an insulator, partially broken away, for the high tension transmission line 12 which is connected at 11 to the insulator 10. Mounted upon the member 11, if desired, by mounting means not shown, or mounted upon the line 12 in any convenient manner so as not to short circuit the turns thereof is a pickup coil or inductor 13, fixed or operatively connected to a parabolic reflector 15. The reflector 15 may be supported by the same means which support coil 13; the leads 16 and 17 of the pickup coil 13 are connected to the terminals of an element source of infrared radiation 18 mounted in the reflector 15 at the focal point thereof or near the focal point. It will be understood that the plane and axis of coil 13 are disposed to provide a maximum signal induced therein by lines of force circling conductor 12. Preferably the element 18 employs a radiating film, such as that shown in FIG. 3, hereinafter described in detail. Radiation from the infrared source 18, following a path indicated at 19, passes through an infrared filter 20 to an infrared detector cell 21 where a signal is generated, the infrared detector 21 being if desired of the photoconductive type, having one terminal 22 thereof connected as an input to an amplifier 23 and having the other terminal thereof connected to a biasing battery 24 and thence by way of lead 25 to the input of the amplifier 23. The resistor 26 connected between leads 22 and 25 provides a path for the cell biasing current from battery 24, and resistor 26 may also serve as a load to have the output signal of the detector cell 21 developed thereacross. The output of the amplifier 23 is applied by lead means 27 to a monitoring device 28 of any convenient design. The amplifier 23 may be tuned to be most responsive to an alternating current input of 120 cycles per second if the transmission line 12 is carrying a 60 cycle current, and the communication line 27 may carry a signal of any desired type to the monitor 28 located at a convenient point for the user of the apparatus.

In the operation of the apparatus of FIG. 1, a small voltage proportional to the instantaneous current in conductor 12 is generated in the pickup coil 13 by inductive coupling to the line, and this causes a heating current to flow through element 18. Preferably, the radiating element 18 has a thermal time constant which is in the order of or smaller than a period of one alternation of the 60 cycle current in line 12. The ellipsoidal mirror 15 projects part of the infrared radiation from source 18 over the aforementioned path 19 to the aforementioned detector 21. The monitor 28 may have as an end device a meter calibrated in current values for the line 12.

As is well known in the art, the power dissipated in a typical transmission line may be in the order of several watts per meter. On the other hand, infrared detectors available in the present state of the art may have noise equivalent powers of the order of $10^{-12}$ watts at one cycle per second. Thus, inherently, a very high signal-to-noise ratio is available, and the apparatus operates satisfactorily if only a small part of the radiated power is extracted for monitoring. Whereas the infrared radiating apparatus, once installed, is not accessible without shutdown, it will be noted that no moving parts are employed, and by suitable design it may be provided that the radiating element is never heated to a temperature at which evaporation takes place, and hence the expected lifetime of the element and the pickup coil may be at least as great as that of the transmission line.

Whereas the apparatus of FIG. 1 is entirely satisfactory, it will be noted that the element is left operating near ambient temperature, to which it tends to return each time the current phase goes through zero in the line 12. This condition of operation does not provide the minimum obtainable time constant. As previously stated, it is desirable, in order that the response of the apparatus to current changes in the line may be speedy, to have an element 18 with a very short time constant of a fraction of one alternation of the current in line 12.

Figure 2:
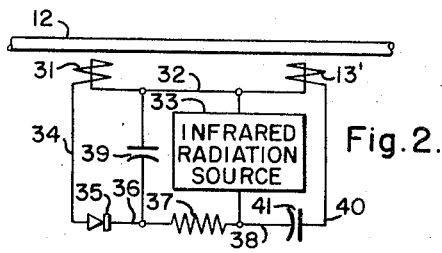
FIG. 2 is a schematic electrical circuit diagram of infrared radiating apparatus according to a second embodiment of the invention.

Particular reference is made now to FIG. 2, in which means is provided for keeping the temperature of an infrared radiator element at some temperature above ambient, to increase the speed of response of the element to variations in current in the line 12. The circuit of FIG. 2 is particularly well suited for use when the infrared radiator is of the filament type, since a filament inherently has a greater time constant than a film because the surface-to-volume ratio is lower. In FIG. 2 it will be noted that the transmission line 12 has two coils inductively coupled thereto, and including in addition to a pickup coil 13′ a bias coil 31 having one terminal thereof connected by way of lead 32 to a source of infrared radiation 33, and having the other terminal thereof connected by way of lead 34, rectifier 35, lead 36, resistor 37 and lead 38 to the other terminal of the infrared source 33. Connected between leads 32 and 36 is a capacitor 39. It will be seen that one terminal of pickup coil 13′ is connected to lead 32, whereas the other terminal of pickup coil 13′ is connected by way of lead 40 and capacitor 41 to the aforementioned lead 38 and thence to the infrared element source 33.

In the operation of the apparatus of FIG. 2, the signal induced in coil 31 is rectified by rectifier 35 and impressed through an R-C circuit comprising capacitor 39 and resistor 37 across element 33, providing a constant temperature biasing potential or current to the infrared source 33, which heats element 33 and raises the temperature thereof to, for example, 600° K. or about 327° C. The second pickup coil 13′ impresses an instantaneous current on the element through the blocking capacitor 41. This circuit arrangement provides for a much shorter time constant in the radiation source 33, and provides other advantages which derive from the following facts: (1) the thermal time constant owing to radiation exchange of the infrared element will be inversely proportional to the cube of the absolute temperature; (2) the radiation from source 33 may increase in intensity and the frequency of the radiation from the infrared source 33 may shift toward the operating region of the most suitable infrared detectors commonly available in the present state of the art; and (3) the accuracy of the current reading at the monitor increases because the second order effects of ambient temperature on the source 33 are decreased. Preferably, the apparatus is arranged so that the operating temperature of the infrared source 33 does not rise above 800° K. (527° C.). A further increase in operating temperature would reduce the life expectancy of the source.

It will be understood that the source 33 of FIG. 2 is used with monitoring apparatus similar to that shown in FIG. 1 comprising an infrared detector similar to detector 21, means for obtaining a signal therefrom which varies in amplitude in accordance with variations in the intensity of the radiation from source 33, means for amplifying that signal, and a monitor responsive to the amplified signal and including if desired a meter calibrated in current values for the line 12.

Figure 3:
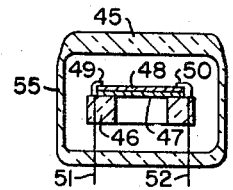
FIG. 3 is a cross-sectional view of an infrared radiating element suitable for use in the invention of FIGS. 1 and 2.

Particular reference is now made to FIG. 3, which shows an infrared radiation source, and in which the reference character 45 represents a window of a material which permits the passage of infrared radiation. At 46 there is shown an insulating ring, which may be of aluminum trioxide, having mounted thereon and freely supporting a thin film 47 of a suitable material, which may also be aluminum trioxide, which may be 500 or less angstroms thick, and which as previously stated is freely supported by the insulator ring. A much thinner coating 48 of another material such as nickel, chromium or silver, or other suitable metal, is evaporated onto the film 47 such that the D.-C. resistance, laterally per square centimeter, is of the order of 200 ohms. Terminals 49 and 50 are evaporated terminals, which may be of platinum, having leads 51 and 52 thereto. The inside of housing 55 may be evacuated, if desired.

As previously stated, it is desirable that the apparatus to be located on the transmission line have as long a life expectancy as possible. To this end the metal film of the infrared element of FIG. 3 is preferably chosen from certain metals which do not change their resistance properties with time, such for example as chromium. If desired, the metal can be subjected to an ageing process before being installed on the line. The aforementioned window 45 may be composed of a substance such as quartz, barium fluoride, or silver chloride. The infrared radiation from the element then passes through the window 45 and is projected toward the receiving cell, not shown in FIG. 3.

As previously stated, in order that an accurate indication of the current in the line may be provided, and in order that indicating apparatus at the monitoring station be quickly responsive to changes in the current in the line, it is desirable that the source of infrared radiation have a short time constant.

Figure 4:
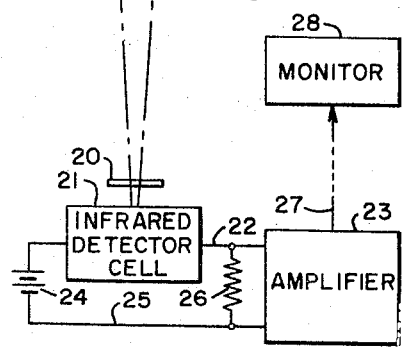
FIG. 4 is a cross-sectional view of apparatus according to a further embodiment of the invention.
Figure 4:
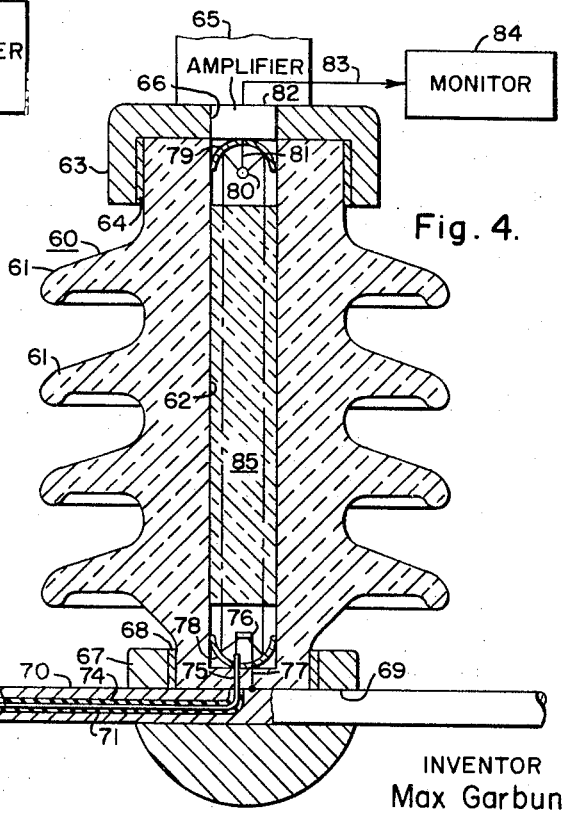
Figure 5:
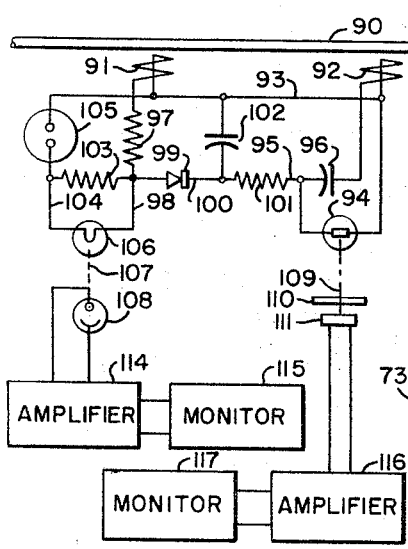
FIG. 5 is a schematic electrical circuit diagram of the preferred embodiment of the invention.

In making apparatus embodying the invention, a user would take into consideration a number of factors including the bandwidth of the amplifier 23 of FIG. 1, or of a corresponding amplifier used in the embodiment of FIGS. 2, 4 and 5, and the available signal-to-noise ratio, based upon the radiation efficiency of the infrared source and the power readily available for energizing the source at the transmission line. Since the radiated power of a film, such as that shown and described in connection with FIG. 3, and that of a filament, are expressible by somewhat different equations, in the discussion hereinafter of choice of parameters, the laws governing a film and a filament will be treated separately.

With respect to a radiating film of the type shown in FIG. 3, under the conditions where it is desired that the temperature rise to within $1/e$ of equilibrium after a time for which $\Delta T$ is much less than $T$, the time constant $\tau$ is given by the equation:

$$\tau = \frac{\text{the excess heat content per cm.}^2}{\text{the excess heat radiated per cm.}^2/\text{sec.}}$$

$$= \frac{\rho c \delta \Delta T}{8\sigma \epsilon T^3 \Delta T} = \frac{\rho c \delta}{8\sigma \epsilon T^3}$$

where:

$\tau$ = time constant
$\rho$ = density
$c$ = specific heat
$\delta$ = thickness
$T$ = temperature in degrees Kelvin
$\epsilon$ = emissivity
$\sigma$ = the Stefan Boltzmann constant = $5.7 \times 10^{-12}$ watts/cm$^{-2}$ degrees $^{-4}$.

A time constant $\tau$ of the order of .01 second may be obtained in practice with easily obtainable values of $\rho$, $\epsilon$, and $c$.

Assume by way of example that for normal temperatures $T = 300°$ K. = 27° C., $\delta$, the thickness, is 500 Angstroms or $5 \times 10^{-6}$ cm., the time constant $\tau$ is .01 second, then the sensitivity, or the r.m.s. power radiated by the two sides of the film element in the absence of temperature biasing is given by the equation:

$$P_{e1} = 4\sigma A \epsilon T^3 \Delta T$$

and further by way of example assume that the area A of the element is 0.25 cm.$^2$, $T = 300°$ K., that $\Delta T$ represents the maximum swing above T during each cycle, and that $\Delta T$ equals 50° C., then the element radiates per second an excess of $3.9 \times 10^{-3}$ watts.

It will be readily understood by those skilled in the art that not all of this radiated power is used by the detector. For example, it can be assumed that only 10% of the radiation is actually gathered at the detector by the optical system shown in FIG. 1. Furthermore, assuming for example that a commercial lead sulfide infrared detector cell is used as the detector 21 and that the detector cell has a cutoff in sensitivity above 4.2 microns, only 0.1% of the radiation from the source 18 may fall within the useful portion of the spectrum. Nevertheless, it will be seen that the power at the detector is still equal to $3.9 \times 10^{-7}$ watts.

Comercially available lead sulfide infrared detector cells are available having a noise equivalent power of $10^{-12}$ watts at one cycle per second. Assuming that the amplifier 23 has a bandwidth of 15 cycles, the useful signal-to-noise ratio is approximately 100,000, and this is more than ample for satisfactory operation of a monitoring device.

Under the conditions described, where the film is not biased, where there is no convection or conduction cooling, the power demands of the radiating element may then be derived, and assuming by way of example that the resistance R of the source or cell 18 is 200 ohms, the A.-C. terminal voltage necessary to energize the cell is given by the formula:

$$V = \sqrt{R \times P_{e1}}$$

which, in the example chosen, is equal to 0.9 volts.

The voltage drop over a typical transmission line may be of the order of 0.03 volt per meter, and by picking up the I-R drop over 30 meters, for example, that is, shunting a current of 4.5 milliamperes through the element, the power needed can be derived, as an alternative to the pickup coils shown in FIG. 1. The previously mentioned signal-to-noise ratio of 100,000 indicates that the pickup points may be only 1 meter apart and that still a sufficient voltage could be provided; for example, a film could be used having a surface 1 millimeter square with a temperature swing of $\Delta T = 1°$ K., providing a signal-to-noise ratio of 100.

Where a filament is employed as a radiating element, as previously stated, the ratio of surface to volume is smaller than for a film of equal volume, and accordingly temperature biasing as provided by the embodiments of FIGS. 2 and 5 is desirable. The time constant $\tau$ of a thin wire or filament of radius $r$ is given by the equation:

$$\tau = \frac{\pi r^2 \delta c \Delta T}{2\pi r 4 \sigma T^3 \epsilon \Delta T} = \frac{r \delta c}{8 \sigma T^3 \epsilon}$$

where the symbols represent similar equantities.

Assume by way of example thaet an oxidized iron wire having a diameter of 1 micron is used as a temperature of 600° K., then $\tau$ equals .008 seconds, and the r.m.s. power radiated by a wire of length L is given by the equation:

$$P_{e1} = 2\pi r L \cdot 4\sigma T^3 \epsilon \Delta T$$

Further, assume by way of example that a whisker 1 millimeter long is employed, and that $\Delta T = 50°$ K., then $$P_{e1} = 3 \times 10^{-6} \text{ watts}$$

Assuming by way of example that a lead sulfide cell responds to 20% of the radiation emitted at 600° K., and that there is 10% optical efficiency, at the detector $P_{det} = 6 \times 10^{-8}$ watts, and the signal-to-noise ratio at 15 cycles bandwidth equals 15,000.

Assuming by way of example that the resistance of the wire whisker is 400 ohms, to energize the radiator the value of the needed A.-C. voltage is supplied by the formula $$V_{R.M.S.} = \sqrt{400 \times 3 \times 10^{-6}} = 3.5 \times 10^{-2} \text{ volts}$$

For the maintenance of a bias temperature of 600° K. the rectified voltage $V_{dc}$ is given by the formula $$V_{dc} = \sqrt{R \cdot \sigma \epsilon T^4 \cdot 2\pi r L} = 8.7 \times 10^{-2} \text{ volts}$$

Both of these voltages are easily obtainable by use of inductors coupled to the line, or they can be directly picked up within a few feet along the transmission line where a source of energizing potential such as that shown in the embodiment of FIG. 4 is utilized.

A time constant of 0.001 second is obtainable in practice by using a temperature biased filament of proper thickness.

Particular reference is made now to FIG. 4 in which an embodiment of the invention is shown in which the path for the infrared radiation is through the central portion of a high voltage insulator. The high voltage insulator, composed of any suitable dielectric, non-conductive material, is generally designated 60, and has a plurality of petticoats 61 disposed at spaced intervals along the length thereof. The insulator 60 has a preferably cylindrical aperture 62 extending substantially through the middle along the length thereof, for purposes to be made more clearly apparent hereinafter. At the upper extremity of the insulator as seen in FIG. 4 a metallic head 63 is firmly connected to the insulator as by cement material 64, the head 63 being connected by the arm 65 to a supporting pole or cross member, not shown. The head 63 also has an aperture 66 centrally disposed therein, which is preferably in alignment with the aforementioned aperture 62, and which is provided for purposes to be made hereinafter more clearly apparent. At the lower extremity of the insulator 60, a metallic head 67 is secured to the insulator as by cement 68, the head 67 having a bore 69 therethrough for receiving a conductor 70 of the high voltage transmission line. The transmission line conductor 70 itself has a bore 71 extending longitudinally therein for a predetermined distance, and disposed within the bore 71 is an insulated wire 72 having the left end thereof as seen in FIG. 4 electrically connected to the transmission line 70 at 73, the remainder of the wire 72 being insulated by insulating covering 74 from the conductor 70. The wire 72 has the end thereof at the insulator brought through a small bore 75 in the end of insulator 60, and this latter end is connected to one terminal of an infrared radiation generating element 76, the other terminal of the infrared radiation generating element 76 being electrically connected by lead 77 to the high voltage conductor 70. It will be seen that the I-R drop across that portion of the high voltage line 70 between connection 73 and a point at which the lead 77 is connected is applied to the infrared element 76 causing the element to emit infrared radiation the intensity of which is in direct measure to the voltage drop across that portion of the line 70 between connection 73 and lead 77, and hence to the current in line 70. Disposed in the aperture 62 in a predetermined position with respect to the I-R radiator 76 is a parabolic mirror 78 for concentrating the radiation from the element 76 along the longitudinal axis of the insulator 60 and in a path in the aforementioned aperture 62.

Disposed within the aforementioned aperture 62 at the upper end thereof is an additional parabolic mirror 79 for receiving radiation from the mirror 78, and concentrating the received radiation upon an I-R detector cell 80 located at the focal point of the mirror 79. The I-R detector cell 80 delivers its output by way of lead means 81 to an amplifier 82, which may be of the solid state variety, and which may be positioned in the bore 66 in the cap or head 63. The amplifier 82 delivers an output by leads or communication line 83 to any suitable monitoring means 84, which may have a meter calibrated in values of the current in the transmission line 70.

The material 85 disposed in the aperture 62 may be quartz for transmitting infrared radiation between source 76 and detector 80, and between mirror 78 and mirror 79. In some applications, where the additional insulative properties of quartz are unnecessary, the aperture 62 may be filled with air or some other suitable gaseous medium, or may be evacuated.

The embodiment of FIG. 4 has the advantage that the infrared source and detector are protected against birds, and the effects of weather including rain, snow and sunshine, variations in the ambient temperature at elements 76 and 80 being reduced because of the insulator 60. The infrared path is completely shielded optically and atmospherically. The aperture 62 may in practice be rather small in diameter, a diameter not exceeding one inch being suitable for the highest voltage applications.

Particular reference is made now to FIG. 5, in which apparatus according to the preferred embodiment of the invention is shown. In FIG. 5, the transmission line 90 has two pickup coils inductively coupled thereto, these being designated 91 and 92. One terminal of the pickup coil 92 is connected to lead 93, and also connected to one terminal of an I-R source 94; the other terminal of the infrared source or element 94 is connected by way of lead 95 and capacitor 96 to the other terminal of the pickup coil 92. One terminal of the pickup coil 91 is connected to lead 93, whereas the other terminal of pickup coil 91 is connected by way of resistor 97, lead 98, rectifier 99, lead 100, and resistor 101 to the aforementioned lead 95 and thence to the I-R source 94. Leads 93 and 100 have a capacitor 102 connected thereacross. A shunt path is provided around the resistor 97, the shunt path consisting of series-connected resistor 103, lead 104 and a shorting device 105, which may be a neon tube or a solid state switch, and which becomes fully conductive when a certain minimum voltage is applied thereto. The resistor 103 has a lamp 106 or other source of visible radiation connected thereacross.

In the operation of the apparatus of FIG. 5, the neon bulb or semiconductor switch 105 is normally open or non-conductive, and the coil 91 develops a signal which flows through the rectifier 99 and is utilized to charge the capacitor 102 and provide a constant biasing voltage on the infrared source 94 and maintain the temperature thereof at a certain predetermined value. The coil 92 applies a signal corresponding to instantaneous small or normal variations in the current in conductor 90 to the source 94 by way of the blocking capacitor 96, so that the intensity of infrared radiation from the source 94 varies in accordance with variations in the line current in transmission line 90. Assume, however, by way of description that a certain surge of current takes place in the transmission line. This surge of current induces a voltage in coil 91 higher than a predetermined limit and fires the semiconductor switch or neon bulb 105 through the resistors 103 and 97. A voltage appears across the resistor 103 which excites the lamp 106 causing visible radiation in proportion to the voltage generated in the pickup coil 91 by the aforementioned surge. This visible light follows a path indicated at 107 and is utilized by a photocell 108, which may be a photovoltaic cell, connected to a suitable amplifier 114, and thence to a monitor 115. On the other hand, the infrared radiation from the source 94 follows the path 109 through a filter 110 to an I-R detector 111 which is connected to a suitable amplifier 116, and thence to a suitable monitor 117.

In choosing the component values for the apparatus of FIG. 5, the value of resistor 103 is made small compared to the value of resistor 97, which may in fact be the internal resistance of the pickup coil 91. This insures that when element 105 becomes conductive, bias is removed from element 94, and 94 does not become so hot that evaporation takes place.

Summarizing, the apparatus of FIG. 5 provides an infrared channel for normal current operation for monitoring normal current changes in the line, and provides a visible channel for high current surges. As previously noted, in the apparatus of FIG. 5 the firing of the neon tube 105 causes the bias to be substantially removed from element 94 to protect the element. Preferably, the device 105 is selected to be conducting with a relatively small voltage, in order to protect the source 94.

The visible radiation source 106 may have a non-linear response, and may be used to accommodate large ranges of transient current in the transmission line 90.

Any suitable means, not shown in the embodiments of FIGS. 1, 2 and 5, may be employed for mounting the pickup coils on or near the transmission line.

The filter 20 may be eliminated if desired.

Other suitable sources of radiation, the outputs of which change with the applied voltage, are electroluminescent devices and recombination radiation devices.

Whereas the invention has been shown and described with respect to some embodiments thereof which give satisfactory results, it should be understood that changes may be made and equivalents substituted without departing from the spirit and scope of the invention.

I claim as my invention:

1. Monitoring apparatus for use with a high potential line comprising, in combination, first voltage obtaining means coupled to the line for obtaining a first voltage which varies in accordance with variations in the current in the line, resistor means and a normally non-conductive device connected in series across the first voltage obtaining means, a normally de-energized source of radiation in the visible portion of the spectrum connected across the resistor means, the normally non-conductive device becoming conductive when the voltage thereacross reaches at least a predetermined value causing a voltage drop across the resistor means, said voltage drop energizing the source of visible radiation, an infrared radiation source, second voltage obtaining means for obtaining a second voltage, circuit means for applying the second voltage to the infrared radiation source to vary the intensity of radiations therefrom in accordance with variations in the current in the line, and other circuit means connecting the infrared radiation source to the first voltage obtaining means for normally applying a temperature biasing potential to the infrared radiation source while the source of visible radiation is not energized.

2. Monitoring apparatus comprising, in combination, first and second inductors disposed in predetermined positions with respect to a transmission line to be monitored, a source of infrared radiation, circuit means connecting said first inductor to said source for utilizing the signal induced in the first inductor by current flowing in the line to provide a biasing potential and heat the source to a predetermined temperature, other circuit means connecting the second inductor to the source for varying the intensity of radiation from the source in accordance with instant variations in the signal induced in the second inductor and hence in accordance with changes in the current in the line, a normally de-energized source of visible radiation, additional circuit means connecting the source of visible radiation to the first inductor and including means whereby when the signal induced in the first inductor reaches at least a predetermined amplitude a voltage is applied to the source of visible radiation to energize the same, a pair of detector means disposed in predetermined positions with respect to the source of infrared radiation and the source of visible radiation, and monitor means operatively connected to the pair of detector means and utilizing the outputs of the pair of detector means to provide a measure of the current in the line and an indication of an excessive fault current condition in the line.

3. Transmission line monitor apparatus comprising, in combination, insulator means for supporting the line at one end of the insulator means and adapted to have the other end thereof secured to a supporting structure, the insulator means having an aperture extending along the length thereof, a two-terminal source of radiant energy mounted in the aperture near the line end of the insulator means, means for obtaining an energizing potential for the source including a conductor disposed inside an adjacent portion of the transmission line and insulated therefrom, one end of the conductor being connected to one terminal of the source, the other end of the conductor being connected to the line, the other terminal of the source being connected to the line, a voltage being developed between the ends of the conductor as a result of the current-resistance voltage drop across the adjacent portion of the line, said developed voltage being applied to the source of radiant energy to energize the same thereby causing the emission of radiation which varies in intensity in accordance with variations in the current in the line, radiant energy detector means located near the other end of the aperture in the insulator means for receiving at least a portion of the radiation and generating a signal proportional in amplitude to the intensity of the received radiation, and monitor means connected to the detector means for utilizing the signal output of the detector means to provide an indication of the current in the transmission line.

4. In transmission line monitor apparatus, in combination, insulator means, the insulator means having an aperture extending along the length thereof, a two-terminal source of radiant energy mounted at the aperture near one end thereof, means connected to the source of radiant energy and coupled to the line for energizing the source of radiant energy and causing the emission of radiation which varies in intensity in accordance with variations in the current in the line, said means for energizing the source of radiant energy including a conductor disposed inside an adjacent portion of the transmission line and insulated therefrom, means connecting one end of the conductor to one terminal of the source of radiant energy, the other end of the conductor being connected to the line, means connecting the other terminal of the source of radiant energy to the line, a voltage being developed between the ends of the conductor as a result of the current-resistance voltage drop across the adjacent portion of the line, said developed voltage being applied to the source of radiant energy to energize the same, and radiant energy detector means located near the other end of the aperture in the insulator means for receiving at least a portion of the radiation and generating a signal proportional in amplitude to the intensity of the received radiation and accordingly proportional to the current in the line.

5. Apparatus according to claim 4 including in addition radiant energy transmitting means disposed in the aperture in the insulator means and extending a substantial distance therethrough, the transmitting means having a characteristic whereby the transmitting means electrically insulates the source of radiant energy from the detector means while providing a path for transmission of the radiant energy without substantial attenuation.

6. Apparatus according to claim 4 including in addition monitor means operatively connected to the detector means for utilizing the signal output of the detector means to provide an indication of the current in the transmission line.

7. Monitoring apparatus for a high potential line, comprising, in combination, first inductor means coupled to the line for obtaining a first voltage which varies in accordance with variations in the current in the line, resistor means and a normally non-conductive neon tube connected in series across the first inductor means, a normally deenergized source of radiation in the visible portion of the spectrum connected across the resistor means, the normally non-conductive neon tube becoming conductive when the voltage thereacross reaches at least a predetermined value causing a voltage drop across the resistor means, said voltage drop energizing the source of visible radiation, an infrared radiation source, second inductor means coupled to the line for obtaining a second voltage, circuit means connected to the second inductor means and to the source of infrared radiation for applying the second voltage to the source of infrared radiation to vary the intensity of radiation therefrom in accordance with variations in the current in the line, and other circuit means including a rectifier and a capacitor connecting the source of infrared radiation to the first inductor means for normally obtaining and applying a temperature biasing potential to the source of infrared radiation while the source of visible radiation is not energized.

8. Apparatus according to claim 7 including in addition a pair of detector means disposed in predetermined positions with respect to the source of infrared radiation and the source of visible radiation, and monitor means operatively connected to the pair of detector means and utilizing the outputs of the pair of detector means to provide a measure of the current in the line and an indication of an excessive fault current condition in the line.

References Cited by the Examiner

UNITED STATES PATENTS

| 2,038,277 | 4/1936 | Gent | 324—96 |
| 2,081,839 | 5/1937 | Rankin | 324—96 |
| 2,302,874 | 11/1942 | Lion | 324—96 |
| 2,389,649 | 11/1945 | Stark | 250—84 X |
| 2,724,821 | 11/1955 | Schweitzer | 324—96 |
| 2,861,165 | 11/1958 | Aigrain | 219—34 |
| 3,100,828 | 8/1963 | Jacobs | 219—34 |

FOREIGN PATENTS 640,335  12/1936  Germany.

WALTER L. CARLSON, *Primary Examiner.*

R. V. ROLINEC, *Assistant Examiner.*